US010437732B2

(12) United States Patent
Greenspan

(10) Patent No.: US 10,437,732 B2
(45) Date of Patent: Oct. 8, 2019

(54) MULTI-LEVEL CACHE WITH ASSOCIATIVITY COLLISION COMPENSATION

(71) Applicant: Intel Corporation, Santa Clara, CA (US)

(72) Inventor: Daniel Greenspan, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 15/378,171

(22) Filed: Dec. 14, 2016

(65) Prior Publication Data

US 2018/0165217 A1 Jun. 14, 2018

(51) Int. Cl.
*G06F 12/0897* (2016.01)
*G06F 12/08* (2016.01)
*G06F 12/0815* (2016.01)
*G06F 12/0846* (2016.01)
*G06F 12/0808* (2016.01)
*G06F 12/0811* (2016.01)
*G06F 12/0855* (2016.01)

(52) U.S. Cl.
CPC .......... *G06F 12/0897* (2013.01); *G06F 12/08* (2013.01); *G06F 12/0815* (2013.01); *G06F 12/0808* (2013.01); *G06F 12/0811* (2013.01); *G06F 12/0846* (2013.01); *G06F 12/0855* (2013.01); *G06F 2212/1021* (2013.01); *G06F 2212/1032* (2013.01); *G06F 2212/608* (2013.01)

(58) Field of Classification Search
CPC .... G06F 12/08; G06F 12/0897; G06F 12/808; G06F 12/0811; G06F 12/0846; G06F 12/0855; G06F 2212/608; G06F 2212/1021; G06F 2212/1032; G06F 12/0808; G06F 12/0815
USPC .......... 711/119, 122, 133, 135, 143
See application file for complete search history.

(56) References Cited

U.S. PATENT DOCUMENTS

| 2007/0067578 | A1* | 3/2007 | Kurichiyath | G06F 12/0897 711/141 |
| 2011/0320720 | A1* | 12/2011 | Walters | G06F 12/128 711/122 |
| 2012/0151144 | A1* | 6/2012 | Yohn | G06F 12/0871 711/122 |
| 2015/0149721 | A1* | 5/2015 | Kannan | G06F 12/0811 711/122 |
| 2016/0170894 | A1* | 6/2016 | Sugisaki | G06F 12/0893 711/125 |

(Continued)

OTHER PUBLICATIONS

U.S. Appl. No. 14/975,752, filed Dec. 19, 2015, entitled "Apparatus and Method for Shared Least Recently Used (LRU) Policy Between Multiple Cache Levels," by Daniel Greenspan.

*Primary Examiner* — Shane D Woolwine
(74) *Attorney, Agent, or Firm* — Trop, Pruner & Hu, P.C.

(57) ABSTRACT

In an embodiment, a processor includes at least one core and a first cache memory including a first plurality of sets having a first plurality of cache lines and associated metadata to store address information, recency information and a first indicator to indicate whether the cache line is associated with an oversubscribed set of a second cache memory. A first cache controller may be configured to base an eviction decision with regard to a first set of the first plurality of sets including a first cache line at least in part on the first indicator of the first cache line. Other embodiments are described and claimed.

23 Claims, 13 Drawing Sheets

(56) References Cited

U.S. PATENT DOCUMENTS

2016/0246734 A1 8/2016 Greenspan et al.
2016/0350232 A1* 12/2016 Knies .................. G06F 12/0888

* cited by examiner

MULTI-LEVEL CACHE WITH ASSOCIATIVITY COLLISION COMPENSATION

TECHNICAL FIELD

Embodiments relate generally to the field of processors. More particularly, embodiments relate to an apparatus, system and method for a cache memory hierarchy.

BACKGROUND

One issue that arises in an associative cache memory is collisions, otherwise known as "hot sets." Associative caches have many sets, and multiple ways per set. A principle of an associative cache is that any given block of system memory addresses (and the associated block of data), if cached, is held in a particular set given according to a function of certain address bits, and may be held in any way of that set. This arrangement allows a realistic look-up mechanism, where a search for an address in the cache may be done by simply checking tags for all ways of the particular set derived from address bits of that address. However, an associative cache set can only hold as many addresses as it has ways. For example, if it is desired to cache five addresses that all map to the same set in an associative cache that has only four ways in each set, this desire cannot be met by the cache, generally resulting in the eviction of one of the ways.

DETAILED DESCRIPTION

Figure 1:
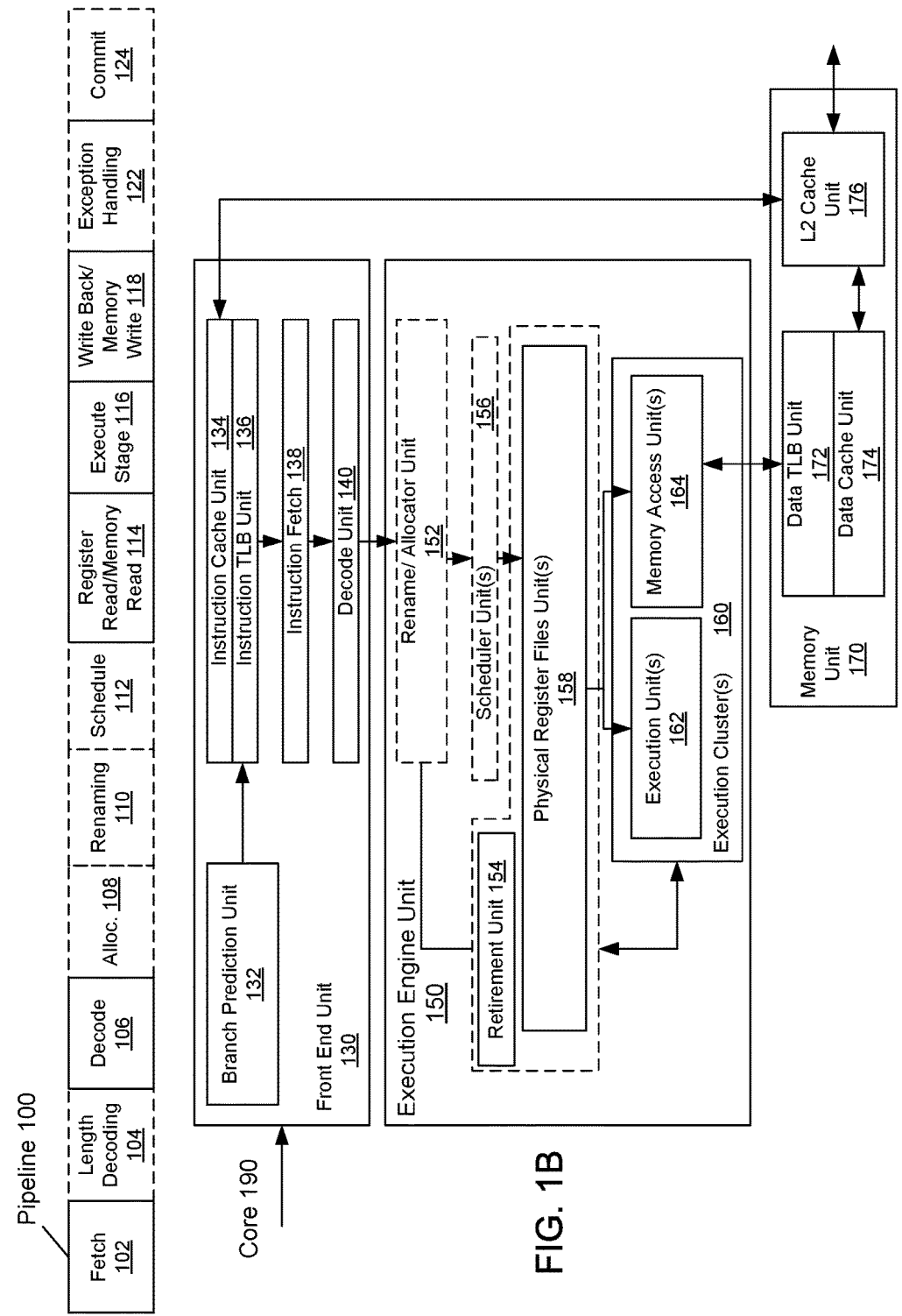
FIG. 1A is a block diagram of an exemplary in-order pipeline and an exemplary register renaming, out-of-order issue/execution pipeline to be included in a processor according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

In various embodiments, a cache memory hierarchy is arranged to allow a lower level cache memory (e.g., smaller, faster, closer to a processing element) (also referred to herein as a first cache memory or an L1 cache memory) to receive an indication from a higher level cache memory (e.g., larger, slower, more distant from a processing element such as a core) (also referred to herein as a second cache memory or an L2 cache memory), on realizing a given number of collisions in any particular set of the higher level cache memory. Based at least in part on this information, the lower level cache memory may make additional efforts to maintain data from that set. In other cases, the lower level cache memory itself may determine the presence of one or more oversubscribed sets of the higher level cache memory. Embodiments may be particularly effective where the mapping from system address to set applies different algorithms in the higher and lower level cache memories. As one example, a lower level cache memory may be configured to hash additional address bits into a set calculation as compared to the higher level cache memory.

Using an embodiment, more effective cache sizing may be realized. This is so, as conventionally a cache memory is sized such that only a very small proportion of its sets are particularly heavily utilized or hot for a given workload, thus preventing performance impact of cache memory misses (such as the cost of fetch from main memory). As such, without an embodiment a cache memory may be designed to be oversized for the true task. Instead with an embodiment, an overall smaller cache memory may be used, or conversely, more complex workloads may be run for the same size cache memory.

Assume that a CPU request results in a L1 cache miss. The data is requested from the L2 cache memory (which either it has stored, or fetches it from main memory). First consider the case where the data is already present in the L2 cache memory. In the process of accessing this cache set as part of the lookup process, the L2 cache memory is aware of the least recently used (LRU) data for all ways of that set (for example, due to reading the set's metadata). There are many different approaches that may be used to implement LRU tracking, and in many such approaches, it may be determined that there is no good candidate way for future eviction from that set (for example in the case where all ways of the set have been accessed fairly recently). In this case, the L2 cache memory may identify that set to be a hot set, and in response to this determination, it sends the requested data to the L1 cache with a hot set indication asserted. Additionally, even though this data was the most recently accessed way in the set from the L2 cache memory, it will be marked with an LRU state as not recently used in the L2 cache memory, and thus a candidate for future eviction.

The L1 cache memory may be configured, as a result of having received the hot set indication, to apply control policies such that the data will be at lower risk of eviction from the L1 cache memory than otherwise would be the case. According to this operation, relief (in the form of an eviction candidate) is provided to the hot set in the L2 cache memory, yet the cost of that relief (the risk of the requested data being lost from both caches) is mitigated by the extra effort expended by the L1 cache memory to keep that data within the L1 cache memory.

Embodiments also may be used in the case where the data is not present in the L2 cache memory. As with the previous case, LRU data for all ways of that set indicates that no good candidate way for eviction is found. The L2 cache memory may determine as a result not to evict other L2 cache data of the set to make way to store the new request, but instead to bypass to the L1 cache memory the data received in response to relaying the request to main memory, together with the hot set indication asserted, without storage of the data in the L2 cache memory. Again, in this case the L1 cache memory, as a result of receiving the hot set indication, will mark its own metadata for the entry such as to discourage its eviction.

One technique that may be used in the L1 cache memory is to assert a "slow aging" bit in its metadata that would result in any way of the set holding the data in the L1 cache memory aging far slower than their peer ways in the same set. In essence, this discouraged eviction results in the accelerated eviction of other ways from the L1 cache set. And, as previously mentioned, where a different mapping of addresses into sets is used for L1 and L2 caches, an eviction may occur out of the L1 set into a (likely) non-hot L2 set, which is a desirable arrangement.

While the embodiments of the invention are discussed above in the context of an "L1" cache and "L2" cache, the underlying principles of embodiments are applicable to any particular set of cache levels. They may also be applied in recursive and in a holistic manner to more than two levels of cache. For example, the L2 cache may hold data relating to hot sets of the L3 cache and the L1 cache may hold data relating to hot sets of the L2 cache.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

FIG. 1A is a block diagram illustrating both an exemplary in-order pipeline and an exemplary register renaming, out-of-order issue/execution pipeline to be included in a processor according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) unit(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector register unit, a write mask register unit, and a scalar register unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. Instruction cache unit 134 and data cache unit 174 may together be considered to be a distributed L1 cache. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 may be coupled to one or more other levels of cache and eventually to a main memory. As described herein, the cache memories may leverage hot set information to control eviction decisions in a manner to longer maintain information in a lower level cache memory and allow corresponding data of a higher level cache memory to be evicted to reduce oversubscription issues.

By way of example, the exemplary register renaming, out-of-order issue/execution core architecture may implement the pipeline 100 as follows: 1) the instruction fetch unit 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set developed by MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1)), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a L1 internal cache, or multiple levels of internal cache. In some embodiments, the system may include a combination of an internal cache and an external cache that is external to the core and/or the processor. Alternatively, all of the caches may be external to the core and/or the processor.

Figure 2:
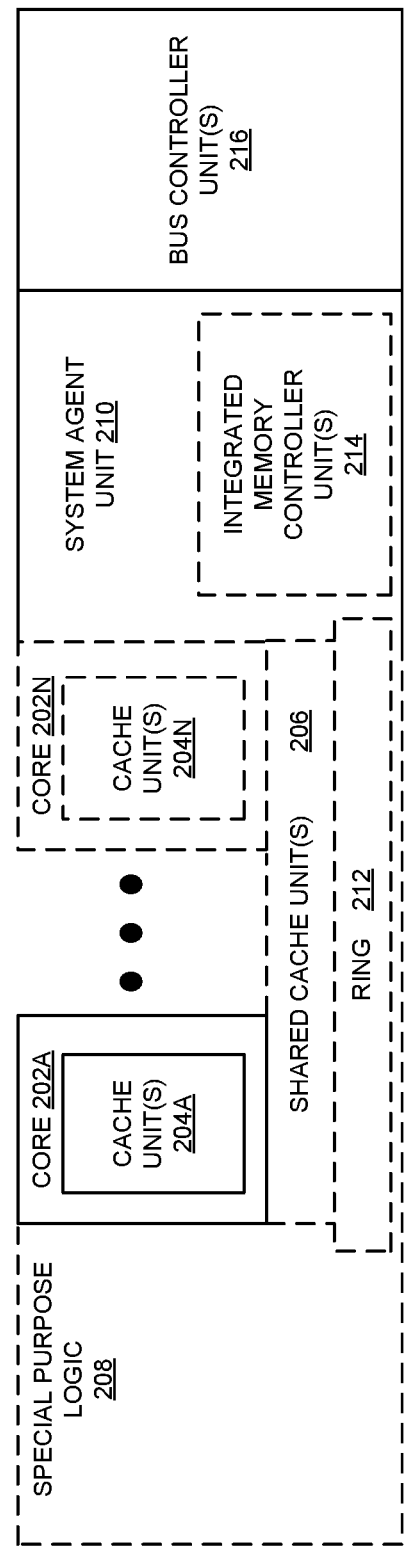
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent unit 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache units 204A-204N (including L1 cache) within the cores, a set of one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects special purpose logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202A-N.

As described herein, embodiments enable interaction between different levels of the cache memory hierarchy to provide indications of oversubscription of sets in a particular cache memory level. In this way, a greater likelihood of maintenance in a lower level cache memory of a cache line for one of these oversubscribed sets may occur. And the corresponding cache line in the oversubscribed set of the higher cache memory level can be more readily evicted, to alleviate the oversubscription situation.

In some embodiments, one or more of the cores 202A-N are capable of multithreading. The system agent unit 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit may be for driving one or more externally connected displays.

The cores 202A-N may be homogenous or heterogeneous in terms of architecture instruction set; that is, two or more of the cores 202A-N may be capable of execution of the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, tablets, handheld PCs, personal digital assistants, engineering workstations, servers, network devices, network hubs, switches, embedded processors, digital signal processors (DSPs), graphics devices, video game devices, set-top boxes, micro controllers, cell phones, smartphones, portable media players, hand held devices, and various other electronic devices, are also suitable. In general, a huge variety of systems or electronic devices capable of incorporating a processor and/or other execution logic as disclosed herein are generally suitable.

Figure 3:
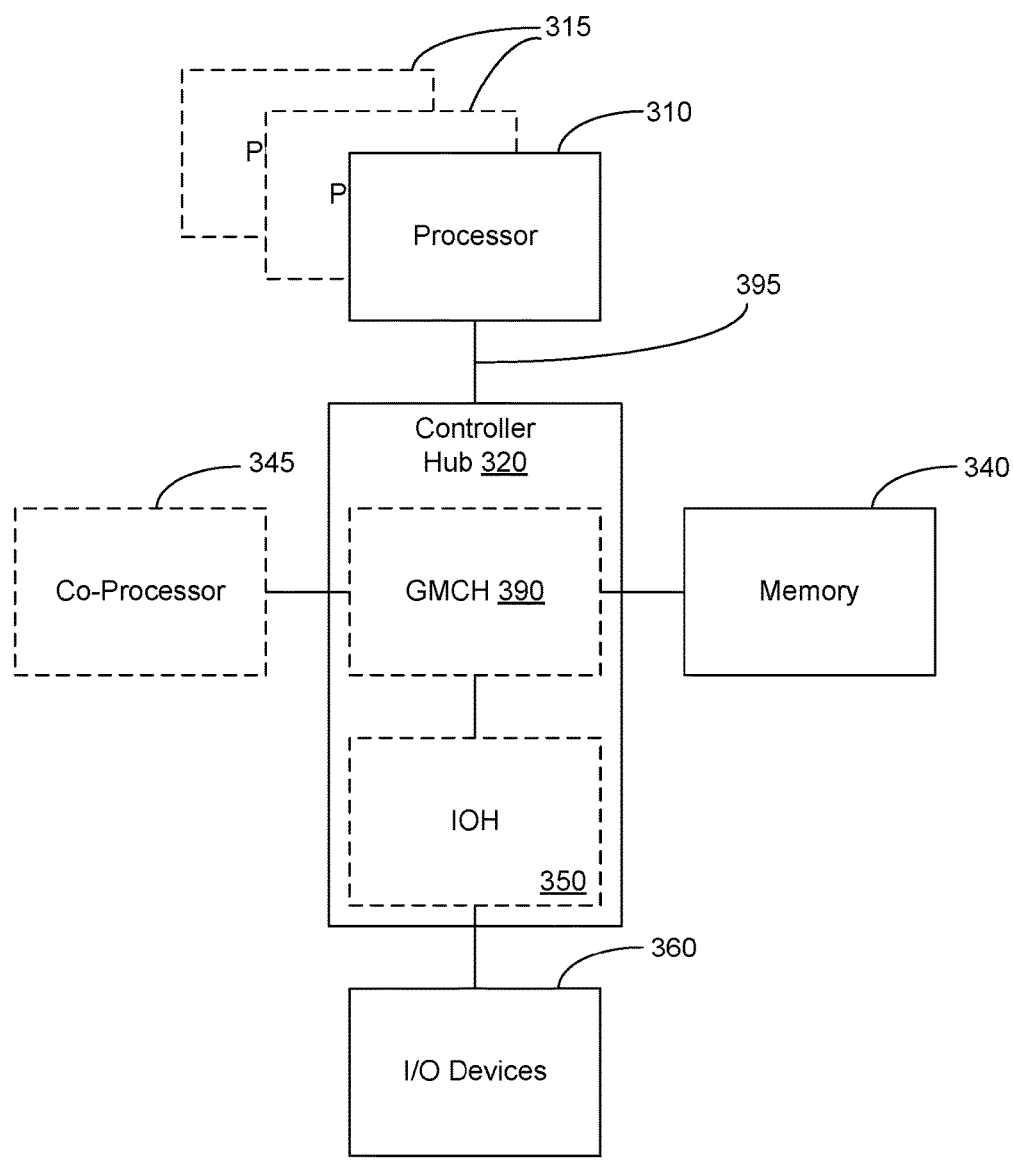
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (these may be on separate chips); the GMCH 390 includes memory and graphics controllers to which are coupled to a memory 340 and a coprocessor 345; the IOH 350 couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 is a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as an Intel® QuickPath Interconnect (QPI), or similar connection 395.

In one embodiment, the coprocessor 345 is a specialpurpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
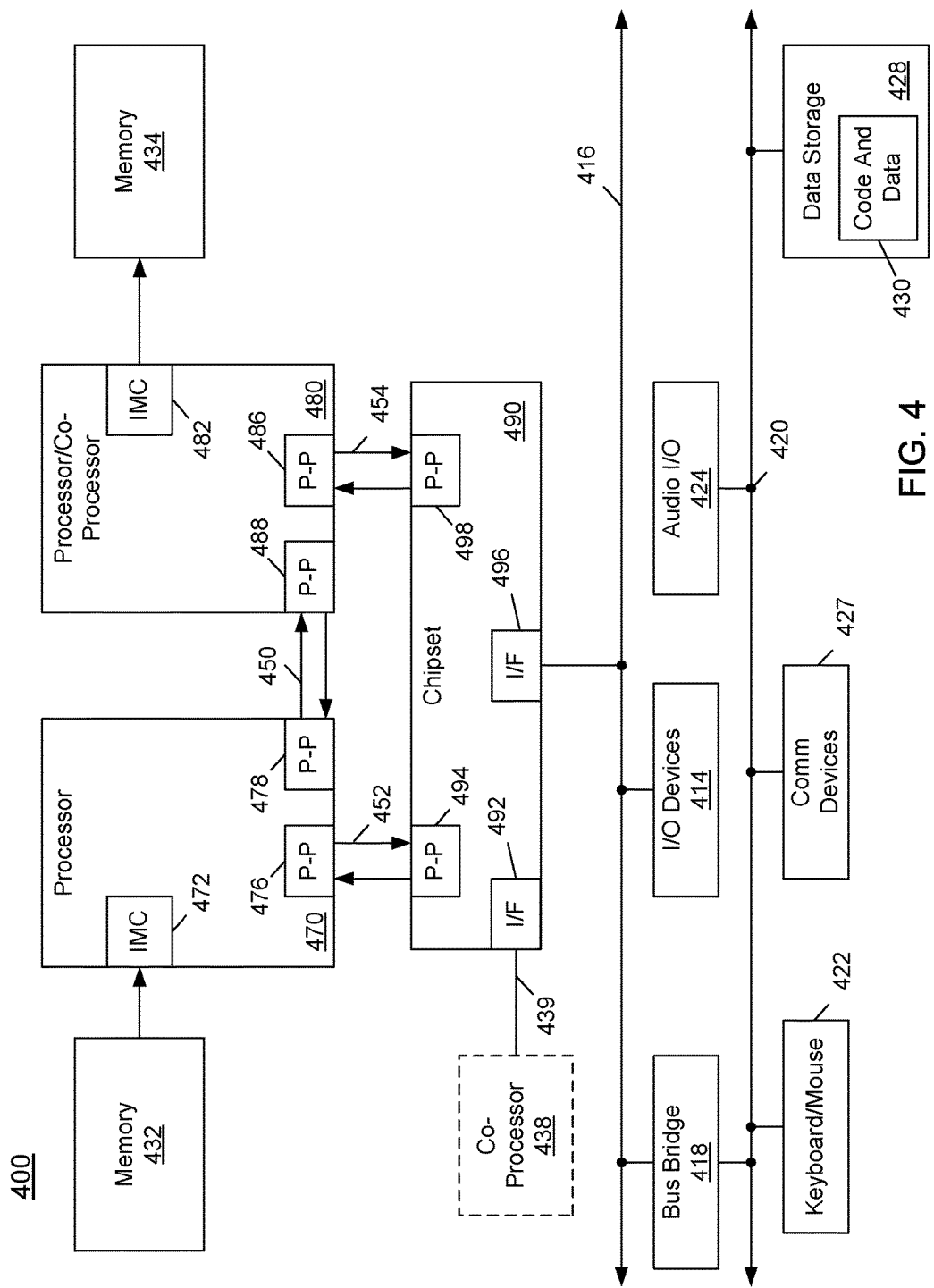
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200 of FIG. 2. In one embodiment, processors 470 and 480 are respectively processors 310 and 315, while coprocessor 438 is coprocessor 345. In another embodiment, processors 470 and 480 are respectively processor 310 and coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a pointto-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439 using point-to-point interface circuit 492. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
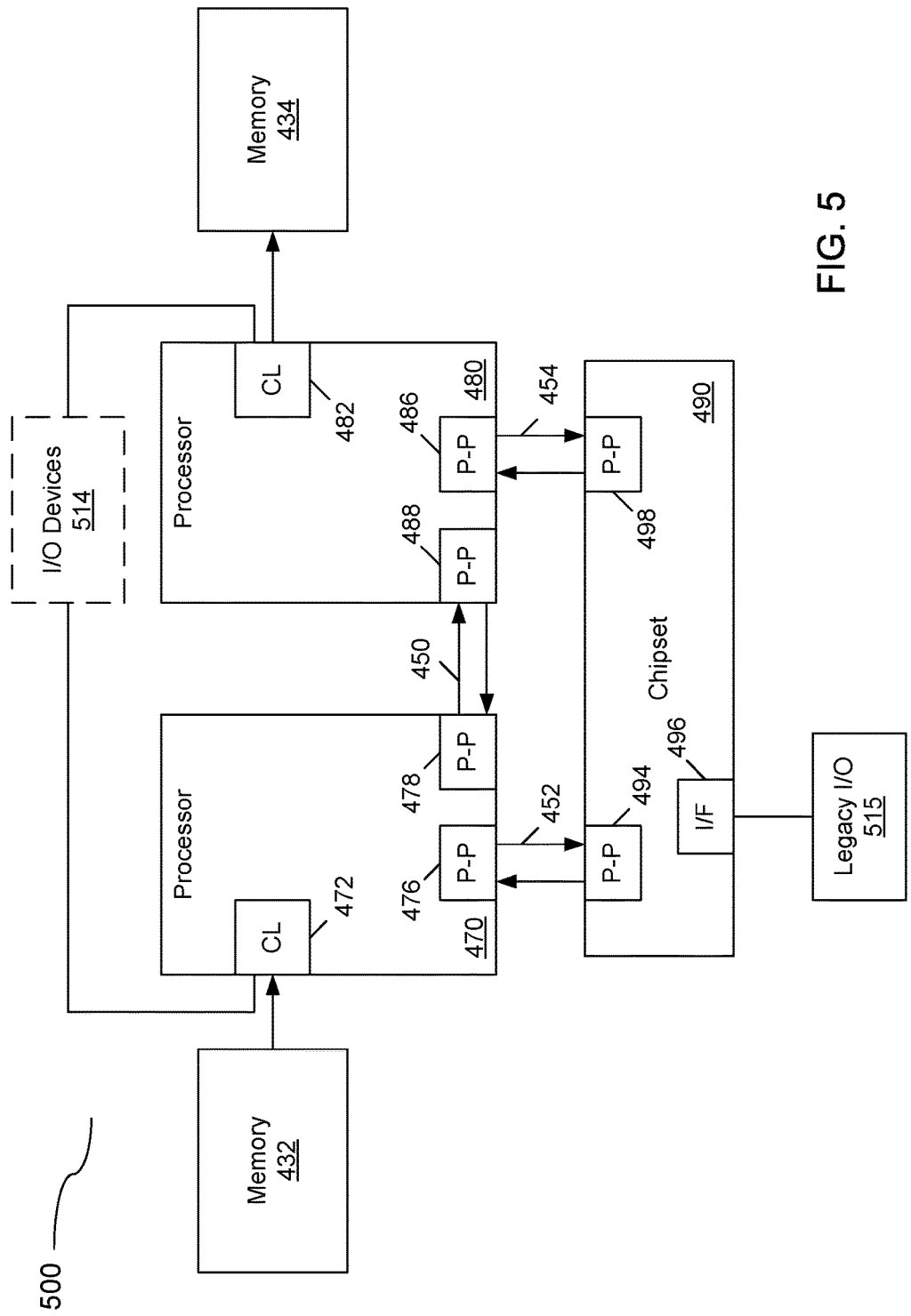
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 may be coupled to the chipset 490.

Figure 6:
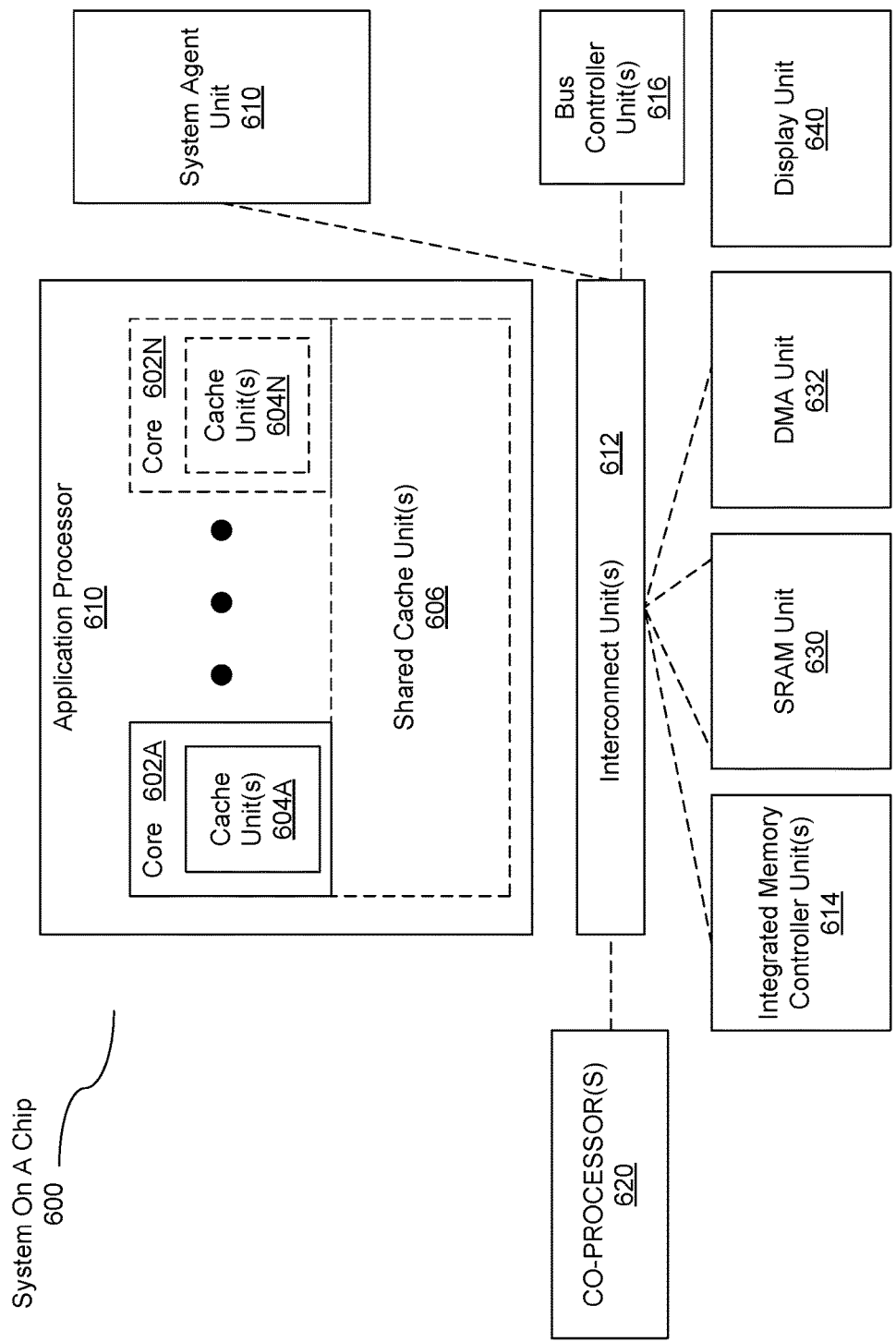
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Also, dashed lined boxes are optional features on more advanced SoCs. In FIG. 6, an interconnect unit(s) 612 is coupled to: an application processor 610 which includes a set of one or more cores 602A-N having cache unit(s) 604A-604N, and shared cache unit(s) 606; a system agent unit 610; a bus controller unit(s) 616; an integrated memory controller unit(s) 614; a set of one or more coprocessors 620 which may include integrated graphics logic, an image processor, an audio processor, and a video processor; a static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible non-transitory, machine readable medium and supplied to various customers or manufacturing facilities to load into the fabrication machines that actually make the logic or processor. Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
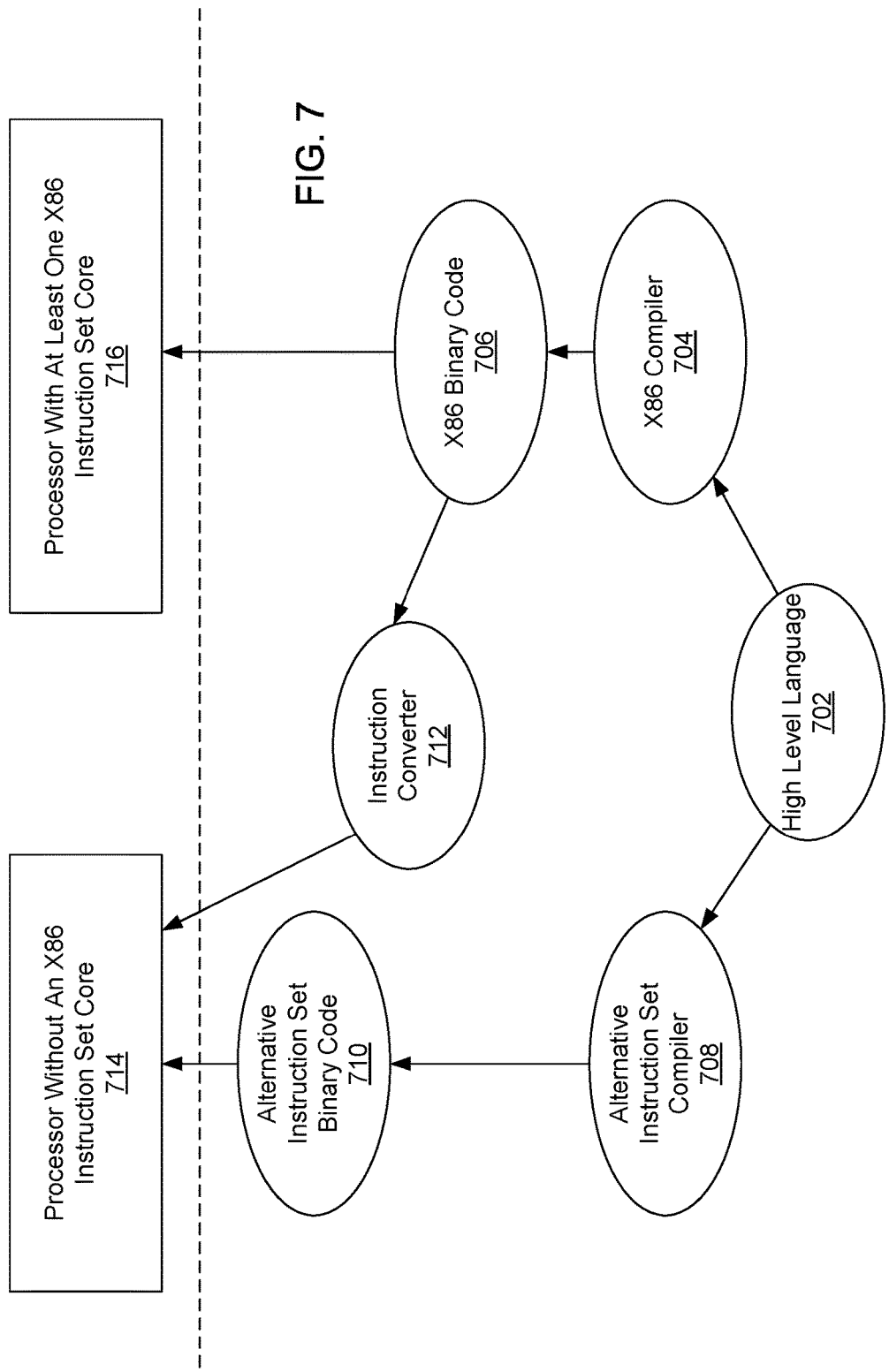
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel® x86 instruction set core or (2) object code versions of applications or other software targeted to run on an Intel processor with at least one x86 instruction set core, in order to achieve substantially the same result as an Intel® processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Figure 8:
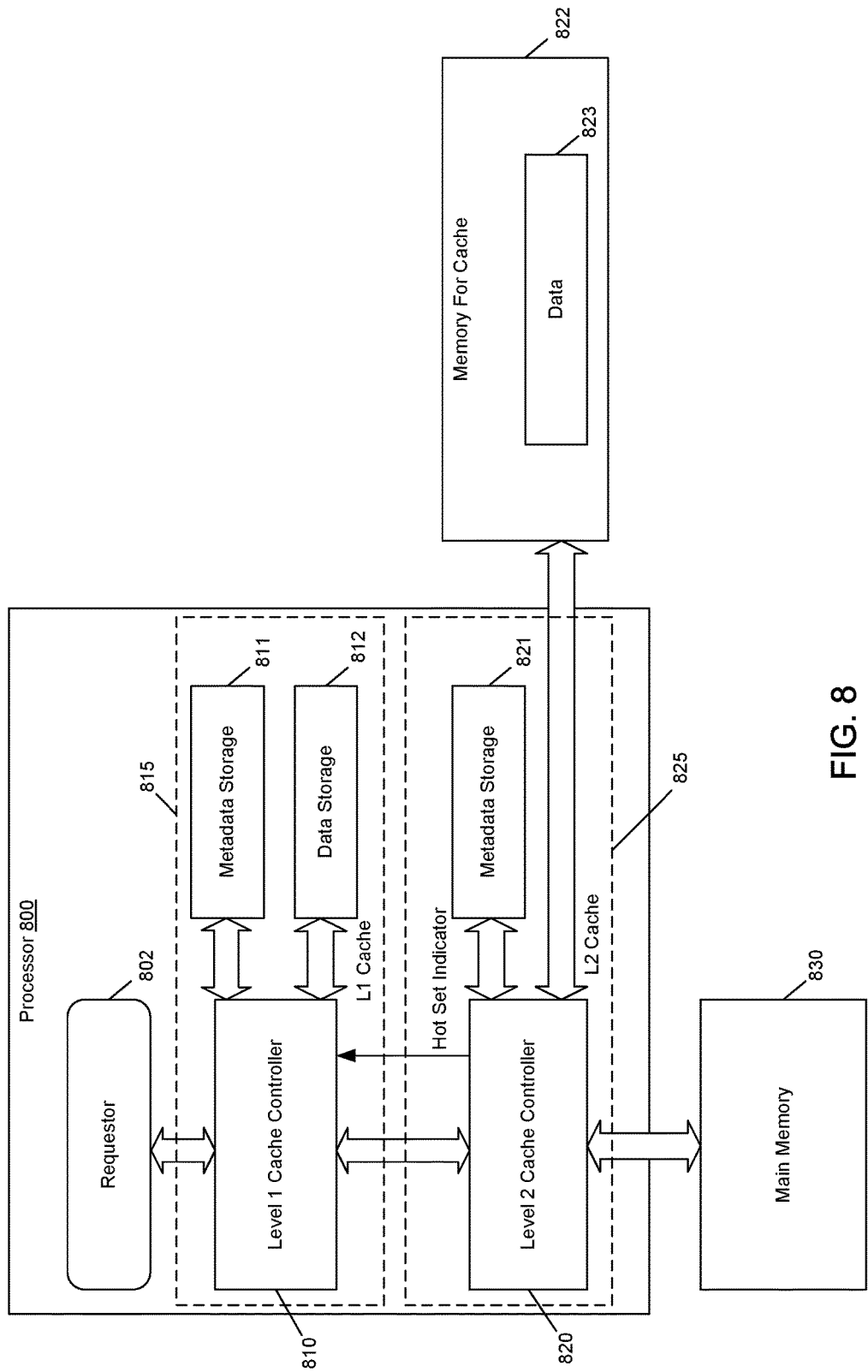
FIG. 8 illustrates pertinent elements of one embodiment of a processor architecture.

FIG. 8 shows an example arrangement of a processor 800 in accordance with an embodiment having two levels of cache within a hierarchy—an L1 cache memory 815 formed of an L1 cache controller 810 and storages 811 and 812 and an L2 cache memory 825 formed of an L2 cache controller 820 and a storage 821. Note that in different embodiments, processor 800 may take the form of a SoC or a chipset. In this example, both cache levels 815, 825 are set-associative. The L1 cache 815 operated by L1 cache controller 810 is small and fast, storing both metadata in storage 811 (e.g., tag, valid bits, dirty indications, LRU indicators, hot set indicators, etc.) and actual data in storage 812 on-die. The L2 cache memory 825 operated by L2 cache controller 820 is larger and slower, and only holds metadata in storage 821 on-die, with the actual data 823 being stored in an off-die memory 822. In an embodiment, this memory may be formed of DRAM or other type of storage technology. It should be noted, however, that the underlying principles of embodiments are not limited to this specific implementation. For example, in some embodiments, both cache levels 815, 825 may store data and metadata on-die. Moreover, there may be additional layers of cache lower than L1 or higher than L2 that may, or may not participate in these embodiments.

A requestor 802 (e.g., a thread executed by the processor 800) generates requests to access data of specific cache lines, using a multi-bit address to identify the lines. One subset of the address bits may be treated by the cache as a set number, and a different subset of the address bits may be treated by the cache as a tag. If the cache lines are stored in the L1 cache 815, then they are provided to requestor 802. If not found in L1 cache 815, then if the cache lines are stored in L2 cache 825, then they are provided to L1 cache 815 and requestor 802. If not, then they may be provided from main memory 830 to requestor 802 and also then cached, e.g., in one or more of the L2 and L1 caches as described below.

In an embodiment, this memory hierarchy may be implemented as a two-level memory (2LM) hierarchy in which processor 800 is coupled to memory 822 and main memory 830, which is more capacious but slower system memory tier. In various embodiments main memory 830 may be a byte-addressable and directly addressable large capacity (e.g., multiple terabytes) memory tier created out of denser storage class memory technologies using phase change materials, memristors, or alternative memory technologies. In different embodiments persistent storage media may include (but is not limited to) one or more non-volatile dual inline memory module (NVDIMM) solutions that materialize persistent memory, such as NVDIMM-F, NVDIMM-N, resistive random access memory, Intel® 3DXPoint™-based memory, and/or other solutions. In a two-level mode of operation, the multiple terabytes of main memory 830 can be hardware-cached by system memory 822 (e.g., DRAM) that is roughly an order of magnitude smaller in comparison, and transparent to software. Such transparent caching enables applications to realize the higher capacity of this memory, but shields them from longer and non-uniform memory latencies presented by the main memory 830.

Figure 9:
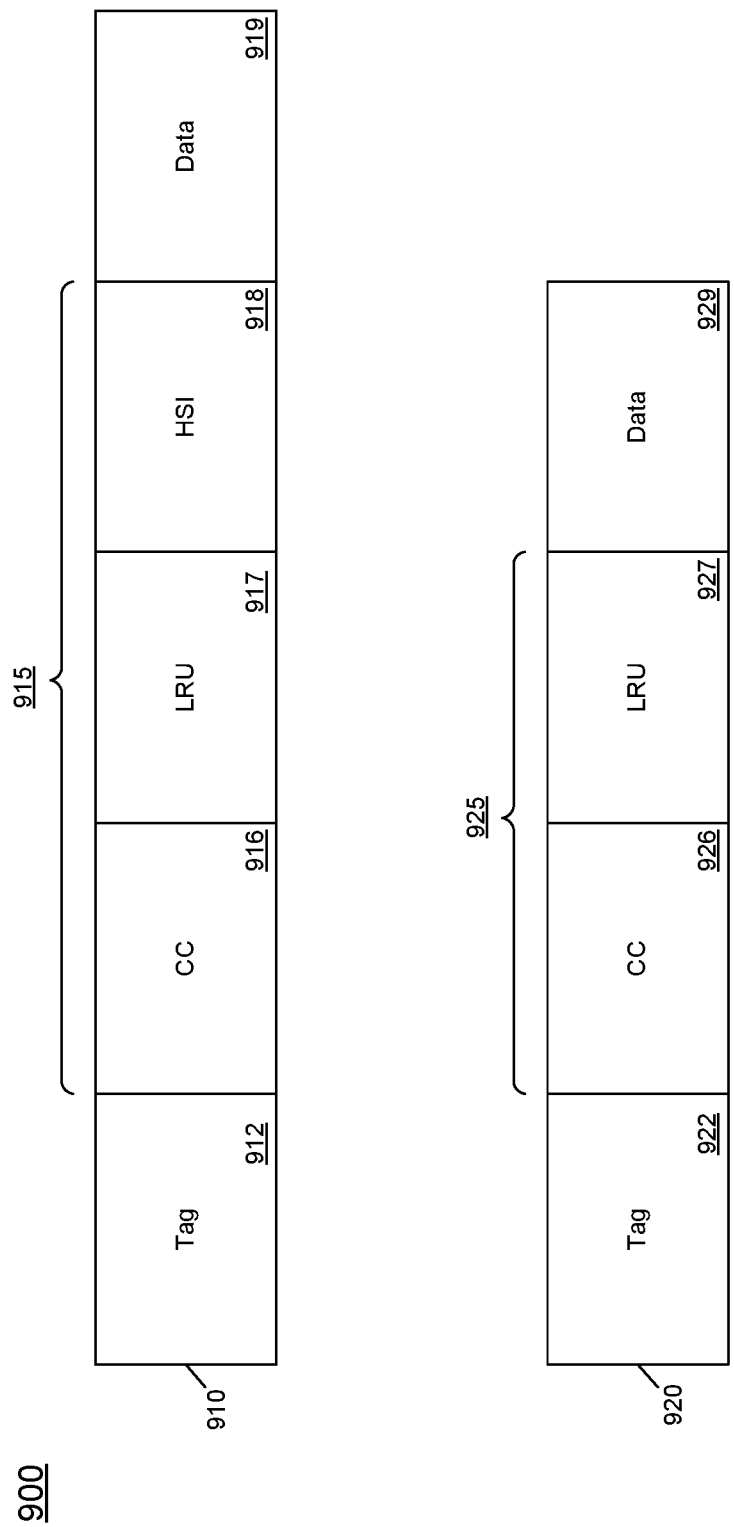
FIG. 9 illustrates representative information formats for cache lines in accordance with an embodiment of the present invention.

Referring now to FIG. 9, shown are representative illustrations of possible information formats for cache lines of a lower level cache in accordance with an embodiment. More specifically, as shown in FIG. 9 illustration 900 includes a first cache line representation 910, which shows example fields that may be stored in a cache line of a lower level cache such as an L1 cache memory. As illustrated, cache line 910 includes a tag field 912 configured to store tag metadata information, e.g., at least a portion of address information for data that in turn is stored in data field 919. In addition to tag and data information, cache line 910 may further include an additional metadata field 915 that includes constituent sub-fields. More specifically shown in the embodiment of FIG. 9, additional metadata field 915 is configured to include a cache coherency sub-field 916 that may store cache coherency information (e.g., according to a MESI cache coherency protocol in one embodiment) and a recency field 917 which may store recency information, e.g., in the form of LRU information. As further illustrated, additional metadata field 915 also stores a hot set indicator 918 which, when active or asserted, indicates that cache line 910 is associated with a set of a higher level cache memory (e.g., an L2 cache) that is oversubscribed. In some embodiments, HSI field 918 is referred to as an oversubscription field. Understand while shown with these particular fields for representative cache line 910, additional or different information may be present in other embodiments.

For example a second cache line representation 920 includes a tag field 922 configured to store tag information for data that in turn is stored in data field 929. In addition to tag and data information, cache line 920 may further include an additional metadata field 925 that includes a cache coherency sub-field 926 and a recency field 927 which may store recency information (and which may include one or more reserved values for hot sets). Of course, other possibilities may exist in other embodiments.

Figure 10:
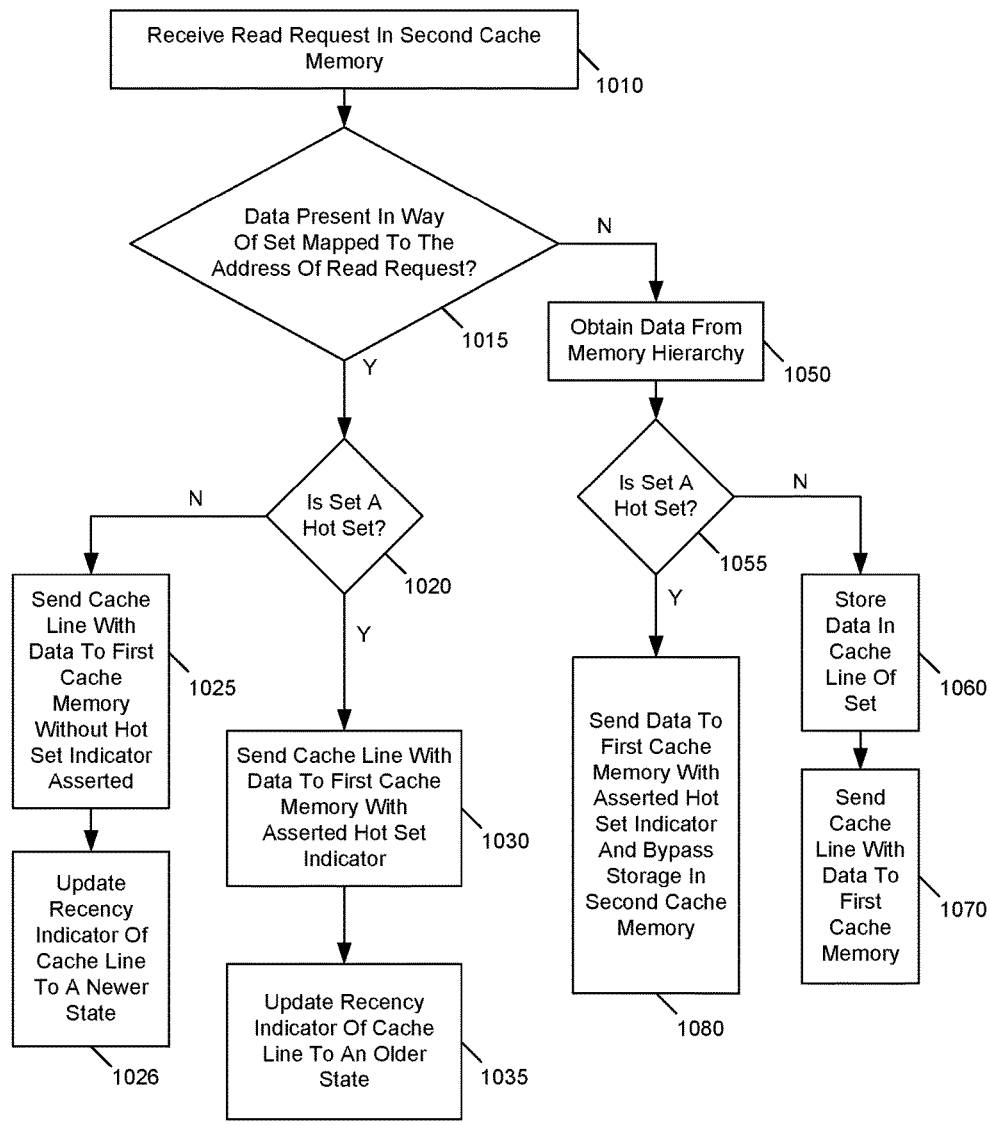
FIG. 10 is a flow diagram of a method in accordance with an embodiment of the present invention.

Referring now to FIG. 10, shown is a flow diagram of a method in accordance with an embodiment of the present invention. More specifically, method 1000 shown in FIG. 10 is used to perform representative operations in a higher level cache memory. For example, in one embodiment method 1000 may be performed by a combination of hardware circuitry, software and/or firmware, at least in part by a cache controller of a second level (e.g., a L2) cache memory. More specifically, method 1000 shows operations performed by such cache controller to realize the oversubscription mitigation techniques described herein.

As seen, method 1000 begins by receiving a read request in this second cache memory (block 1010). Understand that this read request may be received in the second cache memory from a first cache memory (e.g., a lower level cache memory). Also understand that while interaction between L1 and L2 cache memories are discussed for ease of illustration, embodiments are applicable to additional levels of a multi-level memory hierarchy. In an embodiment, this read request may be received responsive to a miss in the first cache memory for requested data.

Control passes to diamond 1015 to determine whether data is present within a set mapped to the address of the read request. Note that the mapping performed in the cache controller to identify the given set of the cache for the requested address may use a different portion of the address (than in L1 cache mapping), such that there may not be a 1:1 mapping between sets in the first cache memory and sets in the second cache memory. Based on identification of the appropriate set and comparison, e.g., of tag information, it is thus determined whether the requested data is present in a way of this set. If so, control passes to diamond 1020 to determine whether this set is a hot set. In an embodiment, this determination may be based on recency information of the various ways of the set. More specifically, if all the ways have been recently accessed and/or this set is listed in an oversubscription table to indicate that there has been a high rate accesses to this set, it can be determined that the set is hot. Of course, other manners of determining a hot set are possible. For example, a miss-based determination is possible as described below. Note that if it is determined that the set is not a hot set, control passes to block 1025 where the cache line including the data is sent to the first cache memory, which may be sent without a hot set indicator asserted. Then control passes to block 1026 where the recency indicator for the cache line in the second cache memory can be updated to a newer state to indicate that an access to this cache line has recently occurred.

Still with reference to FIG. 10, instead if it is determined at diamond 1020 that the set is a hot set, control passes to block 1030. At block 1030 the cache line with the data is sent to the first cache memory. In addition, a hot set indicator may be asserted for this cache line to thus indicate to the first cache memory that measures are to be taken to maintain the cache line in the first cache memory as long as possible as it is now unlikely to be held in the second cache memory, to mitigate the impact of oversubscription for this hot set of the second cache memory. As a result of this indication and techniques to maintain the cache line in the first cache memory as possible, at block 1035 the recency indicator for the cache line in the second cache memory can be updated to indicate an older state. For example, this cache line, for which a copy of the data has been provided to the first cache memory, can be set to a least recently used state. As such, for this oversubscribed or hot set, this cache line may be the next line or way to be evicted. Understand that other control techniques are possible. For example, in certain systems it may be possible to convey to the first cache memory together with the data and hot set indication a 'dirty' indication to indicate that the data is more up-to-date than that of main memory and to immediately invalidate this cache line in the second cache memory at this point, avoiding the need to evict the dirty data to the main memory.

Still with reference to FIG. 10 instead if it is determined at diamond 1015 that the requested data is not present in the second cache memory, control passes to block 1050 where the data is obtained from the memory hierarchy. For example, the data may be obtained from a next portion of the memory hierarchy which, in an embodiment may be a memory-side cache or a non-volatile memory, in some cases. In any event, the data is obtained. Next, it can be determined whether the set (mapped in diamond 1015) is a hot set (diamond 1055). This determination may be as discussed above. If the set is not hot, control passes to block 1060 where the data can be stored in a given cache line of the set (in the process, another way of the set may be evicted, such as is typical for the operation of cache memories). Understand that in connection with storing this data, e.g., recency information for the cache line can be set, e.g., to a most recently used state. Next, control passes to block 1070 where the cache line with data is sent to the first cache memory responsive to the original request.

As further shown in FIG. 10, if instead at diamond 1055 it is determined that the set is a hot set, the data is sent to the cache memory with an asserted hot set indicator (block 1080). Still further, to mitigate oversubscription effects, note that this data is not stored in the second cache memory whatsoever. This may be considered analogous to the data having been stored somehow in the second cache memory and then immediately evicted. Understand while shown at this high level in the embodiment of FIG. 10 of course many variations and alternatives are possible.

Figure 11:
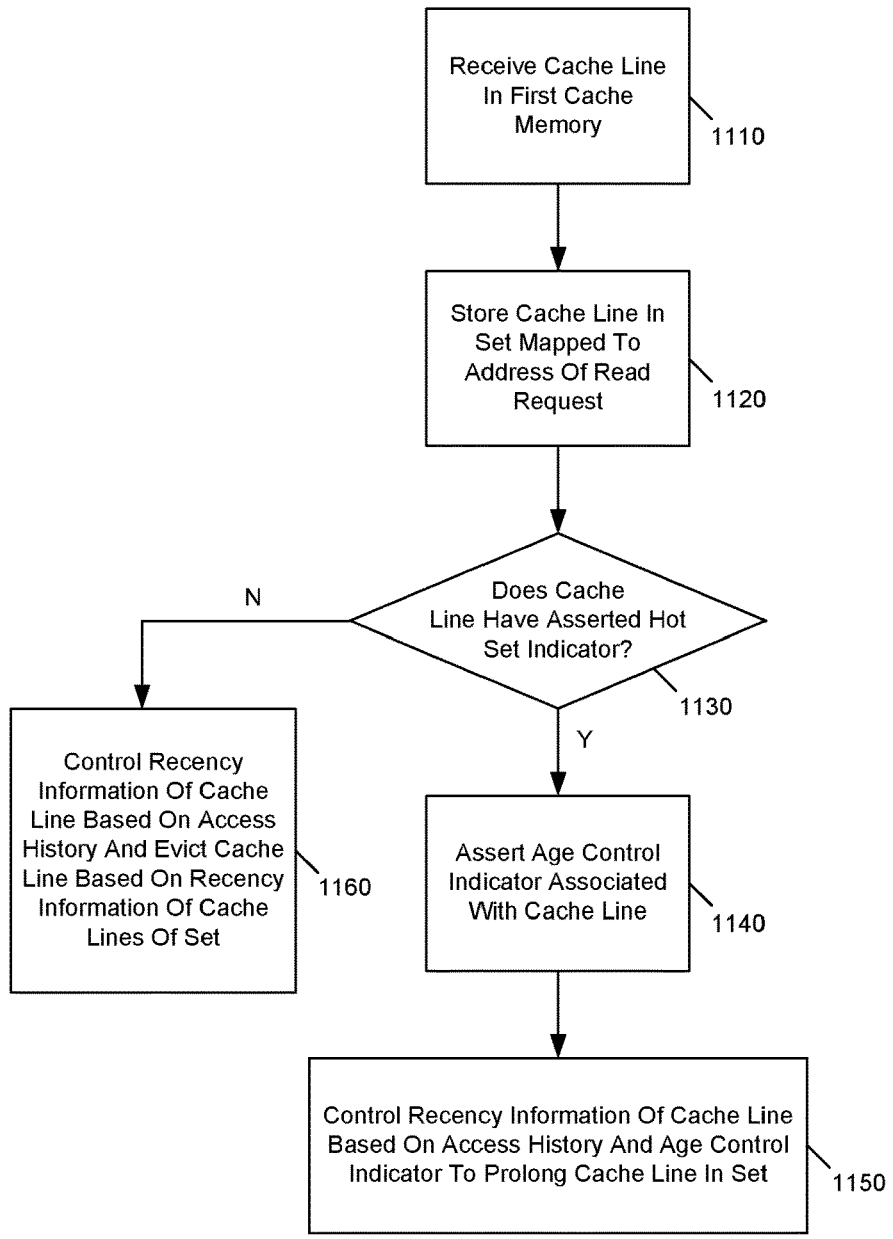
FIG. 11 is a flow diagram of a method in accordance with another embodiment of the present invention.

Referring now to FIG. 11, shown is a flow diagram of a method in accordance with another embodiment of the present invention. As shown in FIG. 11, method 1100 may be performed by a cache controller, e.g., of a first level cache memory to perform representative operations in a lower level cache memory. For example, in one embodiment method 1100 may be performed by a combination of hardware circuitry, software and/or firmware, at least in part by a cache controller of the first level (e.g., a L1) cache memory.

As illustrated, method 1100 begins by receiving a cache line in the first cache memory (block 1110). Understand that this cache line may be received responsive to a request for data that previously missed in this first cache memory. Control next passes to block 1120 where the cache line is stored in a given set that is mapped to the address of the original read request. At diamond 1130, it is determined whether this cache line has an asserted hot set indicator (which may be generated as discussed above in FIG. 10). If not, control passes to block 1160 where recency information of the cache line is controlled based on its access history. For example, upon this initial storage into a given way of the set, the cache line may be set to a most recently used status. As this line ages and is not recently touched, this recency information may be updated to evolve from the most recently used state to a least recently used state, in some cases. In this way, as eviction operations are performed in the set, this cache line may be evicted (possibly) based on its relative recency state vis-à-vis other cache lines of the set. Stated another way, no special treatment or maintenance efforts with regard to this line are made in this situation where the address of the requested data is not associated with a hot set in the second cache memory.

Still with reference to FIG. 11, however if it is determined at diamond 1130 that the cache line does have an asserted hot set indicator, control passes to block 1140 where an age control indicator associated with the cache line is asserted. Understand that this age control indicator may take different forms in different embodiments. For example, in one case a hot set indicator within the cache line may be set to indicate this association between this cache line and a hot set in another cache memory of the cache memory hierarchy. In other cases, recency information may include multiple levels where at least one level (and possibly two or more levels) are allocated to cache lines associated with hot sets in another cache memory level. For example, assume that LRU information may range in one embodiment from 0 to 5. Levels 0-3 may be reserved for normal LRU control for cache lines while instead levels 4 and 5 are reserved for cache lines associated with hot sets. In one such example, a possible implementation is for level 4 to be associated with a most recently used cache line associated with a hot set in another level of a cache hierarchy, while a level value of 5 is associated with a less recently used cache line associated with a hot set.

In any event, from block 1140 control passes to block 1150 where recency information of this cache line is controlled based on its access history and the age control indicator. Continuing with the example described above, special reserved values may be used to prolong the life of this cache line in the set of first cache memory and not evicted, at least in part by more slowly aging this cache line. Understand while shown at this high level in the embodiment of FIG. 11 many variations and alternatives are possible.

Figure 12:
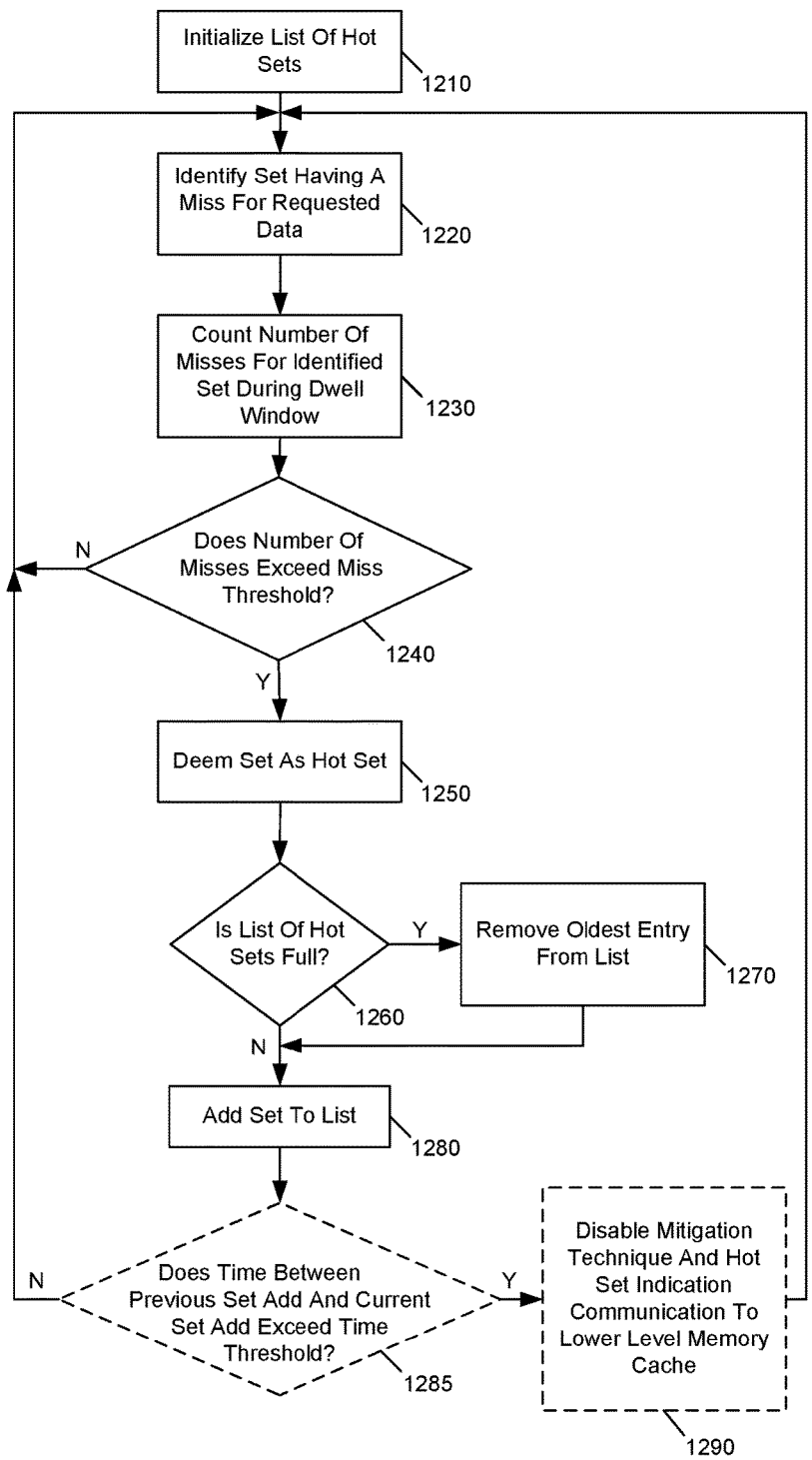
FIG. 12 is a flow diagram of a method in accordance with yet another embodiment of the present invention.

Referring now to FIG. 12, shown is a flow diagram of a method in accordance with yet another embodiment of the present invention. More specifically, method 1200 in FIG. 12 is a method for identifying hot sets in a cache memory as described herein. As such, method 1200 may be performed by a cache controller of a given level of a cache memory hierarchy. With minimal adjustment (such as determining a miss according to the time taken to receive data back from a higher level of cache memory hierarchy), method 1200 may be performed by a cache controller of a given level of a cache memory hierarchy to identify the hot sets at a higher level of the cache memory hierarchy.

As illustrated, method 1200 begins by initializing a list of hot sets (block 1210). For example, this list may be stored in a table storage of the cache controller of the given cache memory level. For example, the L2 cache controller may store a table having multiple entries each to identify a given hot set of the L2 cache memory. This list may also be stored in a table storage of a cache controller at a lower memory level. For example, the L1 cache controller may store a table having multiple entries each to identify a given hot set of the L2 cache memory. Although the number of entries in this table can vary, for purposes of example assume that the table includes 10 entries and thus storage for information of 10 hot sets.

After initialization of this list, control passes to block 1220 where a set is identified that has suffered a cache miss. For example, assume a first set (Set 1) of the L2 cache does not include data requested, e.g., by the L1 cache controller. In response to this cache miss of course normal memory access processing may occur to retrieve the requested data and provide it to the lower level cache memory (e.g., L1). Furthermore, this identification of a set with a miss causes a dwell window to begin where analysis of hot or oversubscribed sets is performed on this particular set.

Thus as seen at block 1230 during the dwell window a count may be maintained of the number of misses in this set. Although the scope of the present invention is not limited in this regard, note that the dwell window may be based on a given number of total fetch indications for the second level cache memory. In an embodiment, assume that this dwell window is of a length of P fetch indications for any set of the cache memory. In an embodiment, this predetermined value P may be chosen to be a given fraction of the total number of sets in the cache memory. As one particular example, assume that the fraction P is set to ½ of the number of sets in the cache memory. As such, in an example in which an L2 cache memory includes 4096 sets, the dwell window P is equal to 2048, namely 2048 cache misses within this L2 cache memory, for completion of the dwell window.

At the conclusion of a given dwell window, it is determined whether the number of misses for this identified set exceeds a miss threshold (diamond 1240). While different thresholds are possible in different embodiments, in one embodiment this miss threshold may be set to a higher than average number of expected misses for a set during the dwell window. For example, with the above dwell window example of a P value set to 2048 cache misses, an expected average number of misses per set during the dwell window is ½. In one embodiment, this miss threshold may be set to a value of Q. Continuing with the above example, the threshold may be set to 3 (namely 6 times the number of expected cache misses).

Note that if at diamond 1240 it is determined that the number of misses does not exceed the miss threshold, control passes back to 1220 for analysis of a next set during a next dwell window. Otherwise when it is determined that the number of misses does exceed the miss threshold, control passes to block 1250 where the set is deemed to be a hot set. Next, control passes to diamond 1260 to determine whether the list of hot sets is full. As discussed above, in one example embodiment the table that stores the hot list may include 10 entries. If no entry is available, control passes to block 1270 where the oldest entry may be removed from the list and control next passes to block 1280 where the set is added to the list. Note that duplicate set indications may be allowed within the list. As such, this list provides a current indication of hot or oversubscribed sets.

Still further with regard to FIG. 12 in some embodiments optional techniques may be used to control communication of the hot set indication to the lower level cache based on the number of oversubscribed sets. That is, in some embodiments where based on a given workload few or no sets are hot sets, it may be appropriate to disable the hot set indication to the first cache memory for performance or other reasons. Thus as seen in FIG. 12, control may optionally pass to diamond 1285 to determine whether the time between a previous set being added to the list and this current set being added to the list exceeds a threshold time. This threshold time may be a predetermined value and may, in an embodiment be set between approximately 1 millisecond and 1 second. If the time between adding these oversubscribed sets to the list is less than the threshold time, control passes back to diamond 1220 for further hot set determinations. Instead if it is determined that the time between adding these hot sets to the list exceeds the threshold time, control passes to block 1290 where the hot set oversubscription mitigation techniques may be disabled and indication communication to the lower level cache memory can be disabled. And then control passes back to block 1220. Understand while shown at this high level in the embodiment of FIG. 12, many variations and alternatives are possible.

Figure 13:
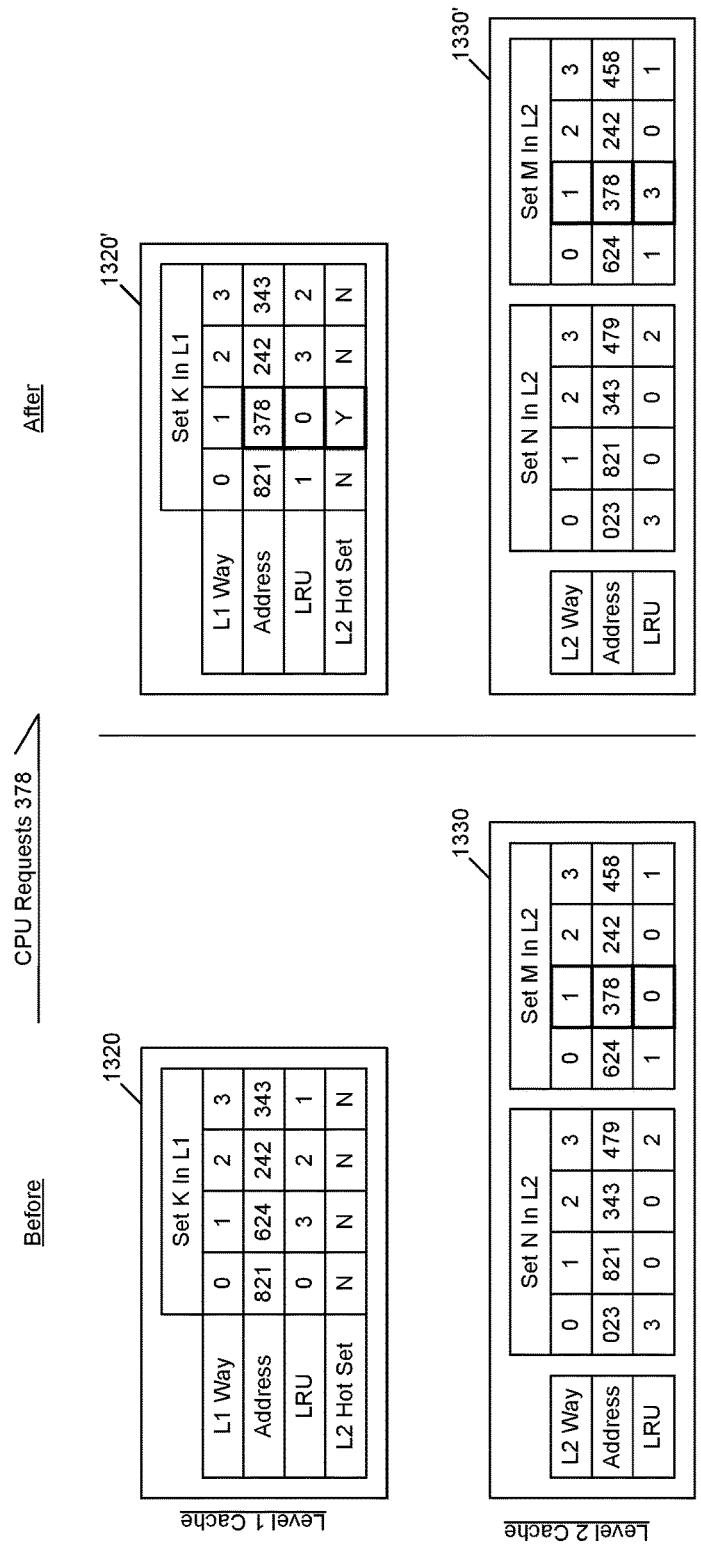
FIG. 13 illustrates one embodiment of operation of a cache memory hierarchy in accordance with one embodiment of the present invention.

Referring now to FIG. 13, illustrated are example control techniques in accordance with an embodiment. In this simplified example, an L2 cache memory 1330 is twice the size of an L1 cache memory 1320, with any one set of the L1 cache memory (e.g., Set K) being mapped into two sets of the L2 cache memory (e.g., odd addresses into Set N and even addresses into Set M). With reference to FIG. 13, when a CPU request for address 378 is handled in L1 cache memory 1320 (which does not find it), it is passed to L2 cache memory 1330 (which does find it in Way 1 of Set M), the L2 cache memory is aware that all ways of set M have a low LRU (and thus were recently used). L2 cache memory 1330 may thus determine set M to be identified as a hot set. The data for address 378 is returned to L1 cache memory 1320 together with an indication that this data is related to a hot set. Having notified L1 cache memory 1330 of data for address 378 together with the hot set indication, the L2 cache memory may mark address 378 of having a high LRU of 3 and not age the LRU of the other ways of the set, as shown in updated L2 cache memory 1330' in FIG. 13.

Meanwhile, as updated at L1 cache memory 1320' has stored alongside the reference to address 378, an indication that the data for this address originated from a hot L2 set. This can be seen by the "Y" in Way 1 of Set K of L1 cache memory 1320'. As a result of this hot set indication, L1 cache memory 1320' will, for future allocation requests, favor eviction of other ways from this set. Thus, it may decide in time that, even though address 378 may in fact be least recently used of its entries, it will instead evict, e.g., Way 3 to make way for a new allocation. Due to Way 3 containing an odd address, this eviction is to Set N in L2 cache memory 1330' (which is not a hot set), and is preferable to evicting address 378, which was set up for eviction back into Set M of L2 cache memory 1330' (likely causing Set M to become hot again). Note in FIG. 13 that Set M of L2 cache memory 1330' may well not be considered a hot set, because it has a good candidate (e.g., Way 1, holding address 378) for eviction, however, the actual determination of whether a set is hot may be by one of many techniques, including those such as shown in FIG. 12 that does not directly consider these LRU values.

Embodiments may be most applicable to cache schemes where there is a high degree of orthogonality between distribution of addresses into L1 sets and distribution of addresses into L2 sets. However, the scheme may be adapted such that even if there is a moderate relationship between the address distributions, the L1 cache memory may be configured to determine which L2 sets are hot on the basis of a single L2 hot set indication. For example, here deducing that if address 378 came from a hot set, then address 242, which is also an even value, came from a hot set and it thus may be preferred to evict to other sets where necessary. It may also possible to compress the manner in which hot set indications are held at the L1 cache memory and hold an indication for each L2 set mapped into a L1 set (e.g., two indications per L1 set in the example of FIG. 13) in place of one indication per way of L1 set (four in the example of FIG. 13).

As one example embodiment, a system with a four-way associative L2 cache memory may perform, with the implementation of techniques described, with nearly the same overall performance as a system with a five-way associative L2 cache memory, with a resulting saving of 20% in allocation of die space for L2 metadata and/or data.

The following examples pertain to further embodiments.

In one example, a processor includes: at least one core; a first cache memory including a first plurality of sets having a first plurality of cache lines and associated metadata to store address information, recency information and a first indicator to indicate whether a first cache line is associated with an oversubscribed set of a second cache memory; a first cache controller to base an eviction decision with regard to a first set of the first plurality of sets including the first cache line at least in part on the first indicator of the first cache line; and the second cache memory including a second plurality of sets having a second plurality of cache lines.

In an example, the first cache controller is to determine that the first cache line is associated with the oversubscribed set of the second cache memory.

In an example, the first cache controller is to determine that the first cache line is associated with the oversubscribed set of the second cache memory based at least in part on a duration to receive requested data of the first cache line from the second cache memory.

In an example, the second cache memory comprises a second cache controller to send to the first cache memory the first indicator having a first state to indicate that data of a read request is associated with an oversubscribed set of the second cache memory.

In an example, the second cache controller is to update recency information of a first cache line of the oversubscribed set to a lower recency state in association with the data being sent to the first cache memory, where the data is stored in the first cache line of the oversubscribed set.

In an example, the second cache controller is to determine an oversubscription based at least in part on recency information of one or more cache lines of the set of the second cache memory.

In an example, the first cache controller is to: receive data from the second cache memory and store the data in the first cache line of the first set of the first plurality of sets; and store an eviction control indicator in the first cache line of the first set to indicate that the first cache line is to age at a slower rate than one or more other cache lines of the first set having an unasserted eviction control indicator.

In an example, the eviction control indicator comprises one or more reserved values of the recency information to indicate association of the data with the oversubscribed set of the second cache memory.

In an example, in response to a request for data, the second cache memory is to receive the data from a memory coupled to the processor and send the data to the first cache memory without storage in the second cache memory, based on a determination of oversubscription of a set of the second cache memory associated with an address of the data.

In an example, the first cache memory is to map a first portion of an address of a request for data to select a set of the plurality of first sets; and the second cache memory is to map a second portion of the address to select a set of the second cache memory.

In an example, the first cache memory comprises a level N cache memory and the second cache memory comprises a level N+1 memory, the level N+1 cache memory comprising a memory-side cache memory.

In another example, a method comprises: receiving, in a first cache memory of a processor, first data and an oversubscription indicator having an asserted state to indicate that an address of the first data is associated with a set of a second cache memory of the processor that is oversubscribed; and storing the first data in a first cache line of a first set of the first cache memory and setting a recency indicator associated with the first cache line to a first value based at least in part on the oversubscription indicator having the asserted state.

In an example, the method further comprises evicting another cache line of the first set of the first cache memory and not evicting the first cache line based at least in part on the first value of the recency indicator associated with the first cache line.

In an example, the method further comprises evicting the another cache line of the first set, where the another cache line is more recently accessed than the first cache line.

In an example, the method further comprises updating the recency indicator of the first cache line at a different rate than one or more other cache lines of the first set based at least in part on the oversubscription indicator having the asserted state.

In an example, the method further comprises: determining that at least a threshold number of sets of the second cache memory are oversubscribed; and in response to the determining, enabling the second cache memory to send the oversubscription indicator having the asserted state.

In an example, the method further comprises: receiving, in the second cache memory, the first data from a memory coupled to the processor; and sending the first data to the first cache memory without storing the first data in the second cache memory when the set of the second cache memory is oversubscribed.

In an example, the method further comprises: sending the first data and the oversubscription indicator having the asserted state to the first cache memory, the first data stored in a first cache line of the set of the second cache memory; and updating recency information of the first cache line of the set of the second cache memory to a lower recency state in response to sending the first data to the first cache memory.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes a processor with at least one core, and first and second cache memories. The first cache memory may include a first cache controller and a first plurality of sets having a first plurality of cache lines and associated metadata to store address information, recency information and a first indicator to indicate whether the cache line is associated with an oversubscribed set of a second cache memory. The second cache memory may include a second cache controller and a second plurality of sets having a second plurality of cache lines, the second cache controller to analyze and identify at least one set of the second plurality of sets as being in an oversubscribed state, and thereafter communicate the first indicator associated with the at least one set of the second plurality of sets to the first cache memory. The system may further include a system memory coupled to the processor.

In an example, the second cache controller is, for a window period, to analyze a number of misses to a first set of the second plurality of sets to identify the first set of the second plurality of sets as an oversubscribed set based at least on part on a comparison of the number of misses to a miss threshold.

In an example, the second cache controller is to evict a more recently used cache line of the first set of the second plurality of sets instead of a less recently used cache line of the first set of the second plurality of sets when data of the more recently used cache line has been sent to the first cache memory, where a first indicator for the more recently used cache line has been communicated to the first cache memory.

In an example, the second cache memory is to send a first cache line to the first cache memory with the first indicator to indicate that the first cache line is associated with an oversubscribed set of the second cache memory, and to invalidate the first cache line in the oversubscribed set of the second cache memory, the first cache line including dirty data.

In an example, the second cache controller is to enable communication of the first indicator when at least a threshold number of sets of the second plurality of sets are oversubscribed.

In a still further example, an apparatus comprises: means for receiving, in a first cache memory of a processor, first data and an oversubscription indicator having an asserted state to indicate that an address of the first data is associated with a set of a second cache memory of the processor that is oversubscribed; means for storing the first data in a first cache line of a first set of the first cache memory; and means for setting a recency indicator associated with the first cache line to a first value based at least in part on the oversubscription indicator having the asserted state.

In an example, the apparatus further comprises means for evicting another cache line of the first set of the first cache memory and not evicting the first cache line based at least in part on the first value of the recency indicator associated with the first cache line.

In an example, the apparatus further comprises means for updating the recency indicator of the first cache line at a different rate than one or more other cache lines of the first set based at least in part on the oversubscription indicator having the asserted state.

In an example, the apparatus further comprises: means for receiving, in the second cache memory, the first data from a memory coupled to the processor; and means for sending the data to the first cache memory without storing the data in the second cache memory when the set of the second cache memory is oversubscribed.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core;
   a first cache memory including a first plurality of sets having a first plurality of cache lines each to store data and a plurality of metadata fields including a first field to store address information, a second field to store recency information and a third field to store a first indicator to indicate whether the corresponding cache line of the first cache memory is associated with an oversubscribed set of a second cache memory;

a first cache controller to base an eviction decision with regard to a first set of the first plurality of sets including a first cache line at least in part on the first indicator stored in the third field of the first cache line; and the second cache memory including a second plurality of sets having a second plurality of cache lines.

2. The processor of claim 1, wherein the first cache controller is to determine that the first cache line is associated with the oversubscribed set of the second cache memory.

3. The processor of claim 2, wherein the first cache controller is to determine that the first cache line is associated with the oversubscribed set of the second cache memory based at least in part on a duration to receive requested data of the first cache line from the second cache memory.

4. The processor of claim 1, wherein the second cache memory comprises a second cache controller to send to the first cache memory the first indicator having a first state to indicate that data of a read request is associated with an oversubscribed set of the second cache memory.

5. The processor of claim 4, wherein the second cache controller is to update recency information of a first cache line of the oversubscribed set to a least recently used state in association with the data being sent to the first cache memory, wherein the data is stored in the first cache line of the oversubscribed set, the least recently used state to cause the first cache line to be a next line to be evicted from the oversubscribed set.

6. The processor of claim 4, wherein the second cache controller is to determine an oversubscription based at least in part on recency information of one or more cache lines of the set of the second cache memory.

7. The processor of claim 1, wherein the first cache controller is to:
receive first data from the second cache memory and store the first data in the first cache line of the first set of the first plurality of sets; and
store an eviction control indicator in the cache line of the first set to indicate that the first cache line is to age at a slower rate than one or more other cache lines of the first set having an unasserted eviction control indicator.

8. The processor of claim 7, wherein the eviction control indicator comprises one or more reserved values of the recency information to indicate association of the first data with the oversubscribed set of the second cache memory.

9. The processor of claim 1, wherein, in response to a request for data, the second cache memory is to receive the data from a memory coupled to the processor and send the data to the first cache memory without storage in the second cache memory, based on a determination of oversubscription of a set of the second cache memory associated with an address of the data.

10. The processor of claim 1, wherein:
the first cache memory is to map a first portion of an address of a request for data to select a set of the plurality of first sets; and
the second cache memory is to map a second portion of the address to select a set of the second cache memory.

11. The processor of claim 1, wherein the first cache memory comprises a level N cache memory and the second cache memory comprises a level N+1 memory, the level N+1 cache memory comprising a memory-side cache memory.

12. A machine-readable medium having stored thereon instructions, which if performed by a machine cause the machine to perform a method comprising:
in response to a request for first data from a first core that misses in a first cache memory of a processor, sending a request for the first data to a second cache memory of the processor;
receiving, in the first cache memory of the processor, in response to the request for the first data that previously missed in the first cache memory, from the second cache memory, the first data and an oversubscription indicator having an asserted state to indicate that an address of the first data is associated with a set of the second cache memory of the processor that is oversubscribed; and
storing the first data in a first cache line of a first set of the first cache memory, storing the oversubscription indicator in a first metadata field included in the first cache line and setting a recency indicator stored in a second metadata field included in the first cache line to a first value based at least in part on the oversubscription indicator having the asserted state.

13. The machine-readable medium of claim 12, wherein the method further comprises evicting another cache line of the first set of the first cache memory and not evicting the first cache line based at least in part on the first value of the recency indicator associated with the first cache line, the first value to cause the first data to be at a lower risk of eviction from the first cache memory.

14. The machine-readable medium of claim 13, wherein the method further comprises evicting the another cache line of the first set, wherein the another cache line is more recently accessed than the first cache line.

15. The machine-readable medium of claim 12, wherein the method further comprises updating the recency indicator of the first cache line at a different rate than one or more other cache lines of the first set based at least in part on the oversubscription indicator having the asserted state.

16. The machine-readable medium of claim 12, wherein the method further comprises:
determining that at least a threshold number of sets of the second cache memory are oversubscribed; and
in response to the determining, enabling the second cache memory to send the oversubscription indicator having the asserted state.

17. The machine-readable medium of claim 12, wherein the method further comprises:
receiving, in the second cache memory, the first data from a memory coupled to the processor; and
sending the first data to the first cache memory without storing the first data in the second cache memory when the set of the second cache memory is oversubscribed.

18. The machine-readable medium of claim 12, wherein the method further comprises:
sending the first data and the oversubscription indicator having the asserted state to the first cache memory, the first data stored in a first cache line of the set of the second cache memory; and
updating recency information of the first cache line of the set of the second cache memory to a lower recency state in response to sending the first data to the first cache memory.

19. A system comprising:
a processor comprising:
at least one core;
a first cache memory including a first cache controller and a first plurality of sets having a first plurality of cache lines each to store data and a plurality of metadata fields including a first field to store address information, a second field to store recency information and a third field to store a first indicator to indicate whether the corresponding cache line is associated with an oversubscribed set of a second cache memory; and the second cache memory including a second cache controller and a second plurality of sets having a second plurality of cache lines, the second cache controller to analyze and identify at least one set of the second plurality of sets as being in an oversubscribed state, and thereafter communicate the first indicator associated with the at least one set of the second plurality of sets to the first cache memory, to cause the first cache controller to store the first indicator in the third field of one of the first plurality of cache lines of one of the first plurality of sets; and a system memory coupled to the processor.

20. The system of claim 19, wherein the second cache controller is, for a window period, to analyze a number of misses to a first set of the second plurality of sets to identify the first set of the second plurality of sets as an oversubscribed set based at least on part on a comparison of the number of misses to a miss threshold.

21. The system of claim 20, wherein the second cache controller is to evict a more recently used cache line of the first set of the second plurality of sets instead of a less recently used cache line of the first set of the second plurality of sets when data of the more recently used cache line has been sent to the first cache memory, wherein a first indicator for the more recently used cache line has been communicated to the first cache memory.

22. The system of claim 19, wherein the second cache memory is to send a first cache line to the first cache memory with the first indicator to indicate that the first cache line is associated with an oversubscribed set of the second cache memory, and to invalidate the first cache line in the oversubscribed set of the second cache memory, the first cache line including dirty data.

23. The system of claim 19, wherein the second cache controller is to enable communication of the first indicator when at least a threshold number of sets of the second plurality of sets are oversubscribed.

* * * * *